United States Patent
Sugiyama

(10) Patent No.: US 8,872,903 B2
(45) Date of Patent: Oct. 28, 2014

(54) STEREOSCOPIC VIDEO PROCESSOR AND STEREOSCOPIC VIDEO PROCESSING METHOD

(75) Inventor: Tooru Sugiyama, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 219 days.

(21) Appl. No.: 13/215,902

(22) Filed: Aug. 23, 2011

(65) Prior Publication Data

US 2012/0162398 A1 Jun. 28, 2012

(30) Foreign Application Priority Data

Dec. 28, 2010 (JP) ................................. 2010-293421

(51) Int. Cl.
*H04N 13/04* (2006.01)
*H04N 9/47* (2006.01)
*G06T 15/00* (2011.01)
*H04N 13/00* (2006.01)

(52) U.S. Cl.
CPC ....... *H04N 13/0022* (2013.01); *H04N 13/0438* (2013.01); *H04N 13/007* (2013.01)
USPC ................... 348/54; 348/43; 345/419

(58) Field of Classification Search
CPC  H04N 13/0438; H04N 13/0022; H04N 3/007
USPC .......................................................... 348/54
See application file for complete search history.

(56) References Cited

U.S. PATENT DOCUMENTS

2005/0190180 A1* 9/2005 Jin et al. ................. 345/419
2011/0025821 A1* 2/2011 Curtis et al. ............ 348/43

FOREIGN PATENT DOCUMENTS

| JP | 7-154829 | 6/1995 |
|---|---|---|
| JP | 9-192349 | 7/1997 |
| JP | 2002-125246 | 4/2002 |
| JP | 2004-180069 | 6/2004 |
| JP | 2004-289527 | 10/2004 |
| JP | 2004289527 | * 10/2004 |
| JP | 2006-262191 | 9/2006 |
| JP | 2010-164608 | 7/2010 |
| JP | 2010-268036 | 11/2010 |

OTHER PUBLICATIONS

Norman et al. "Stereopsis and Aging", Vision Research 48 (2008), pp. 2456-2465.*
Japanese Patent Application No. 2010-293421, Notice of Rejection, mailed Dec. 6, 2011, (with English Translation).

* cited by examiner

*Primary Examiner* — Hee-Yong Kim
(74) *Attorney, Agent, or Firm* — Blakely, Sokoloff, Taylor & Zafman LLP

(57) ABSTRACT

According to one embodiment, a stereoscopic video processor includes a mode setting module, an adjustment module, and a communication module. The mode setting module sets a mode from among a plurality of modes each specifying an adjustment amount related to the disparity between first stereoscopic video and second stereoscopic video. The adjustment module adjusts the disparity between the first stereoscopic video and the second stereoscopic video by an adjustment amount corresponding to the mode set by the mode setting module. The communication module communicates with stereoscopic glasses for viewing the first stereoscopic video and the second stereoscopic video the disparity between which is adjusted by the adjustment module.

7 Claims, 8 Drawing Sheets

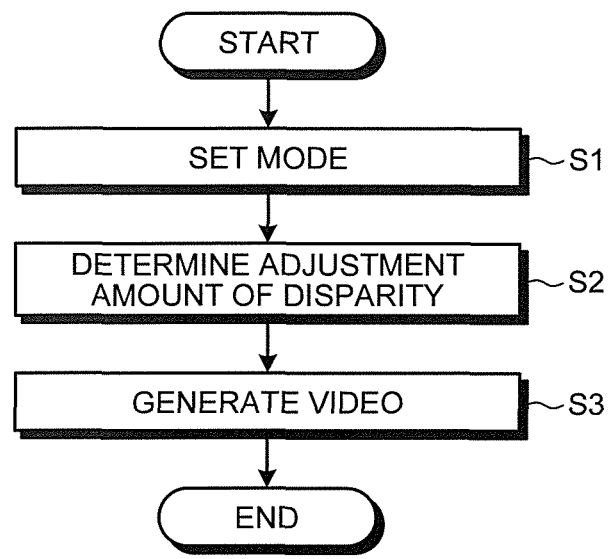
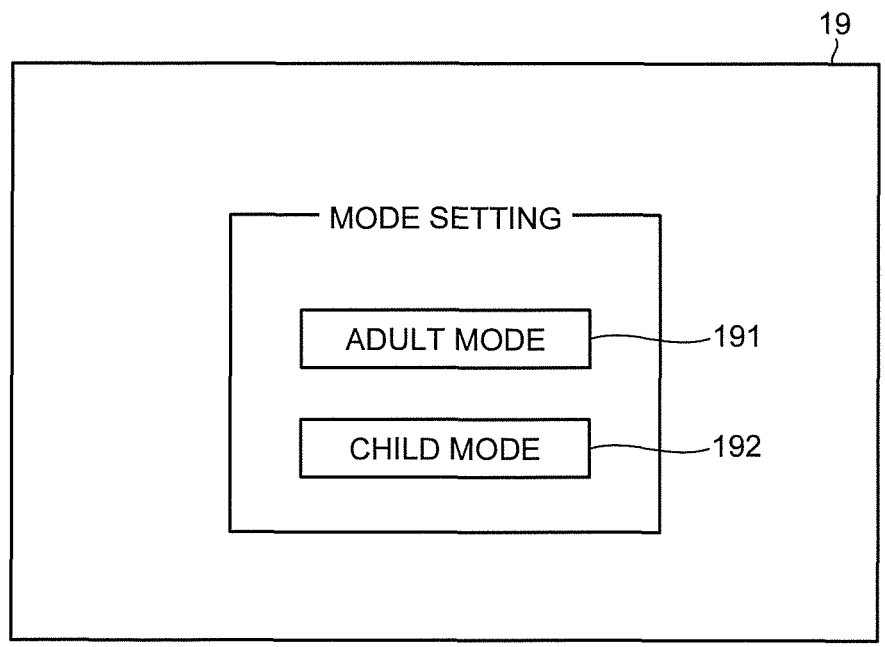

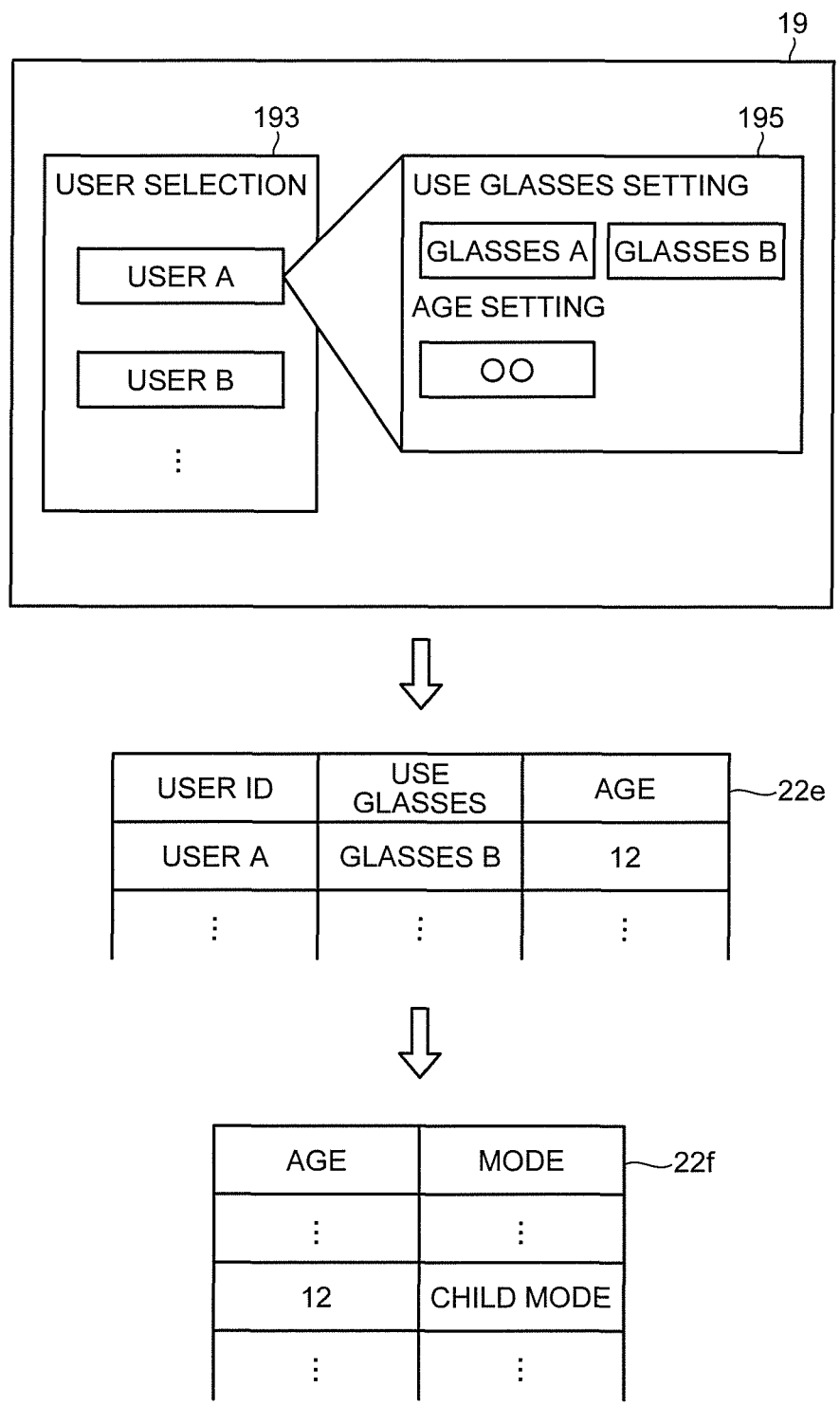

STEREOSCOPIC VIDEO PROCESSOR AND STEREOSCOPIC VIDEO PROCESSING METHOD

CROSS-REFERENCE TO RELATED APPLICATIONS

This application is based upon and claims the benefit of priority from Japanese Patent Application No. 2010-293421, filed Dec. 28, 2010, the entire contents of which are incorporated herein by reference.

FIELD

Embodiments described herein relate generally to a stereoscopic video processor and a stereoscopic video processing method.

BACKGROUND

There are available stereoscopic video processors that provide two types of videos having disparity corresponding to the interocular distance of the user so that the user can experience stereoscopic (three-dimensional) video. The user views the two types of videos provided by such a stereoscopic video processor by wearing stereoscopic glasses that enables he/she to view video for right eye with his/her right eye and video for left eye with his/her left eye.

There is a difference between individuals in the interocular distance. Accordingly, appropriate disparity between video for right eye and video for left eye varies depending on the individuals. For example, the interocular distance of a child is narrower than that of an adult. If a child views video having disparity suitable for adults, the video is recognized as being magnified in the depth direction. With the conventional stereoscopic video processors, it is difficult to adjust the disparity for each of users.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 6 is an exemplary flowchart of the operation of the TV broadcast receiver in the embodiment;

FIG. 7 is an exemplary conceptual diagram of a mode setting screen in the embodiment;

FIG. 9 is an exemplary conceptual diagram for explaining user information registration in the embodiment.

DETAILED DESCRIPTION

In general, according to one embodiment, a stereoscopic video processor comprises a mode setting module, an adjustment module, and a communication module. The mode setting module is configured to set a mode from among a plurality of modes each specifying an adjustment amount related to disparity between first stereoscopic video and second stereoscopic video. The adjustment module is configured to adjust the disparity between the first stereoscopic video and the second stereoscopic video by an adjustment amount corresponding to the mode set by the mode setting module. The communication module is configured to communicate with stereoscopic glasses for viewing the first stereoscopic video and the second stereoscopic video the disparity between which is adjusted by the adjustment module.

Exemplary embodiments will be described in detail below with reference to the accompanying drawings. The stereoscopic video processor of the embodiments will be described by way of example as a television (TV) broadcast receiver.

Figure 1:
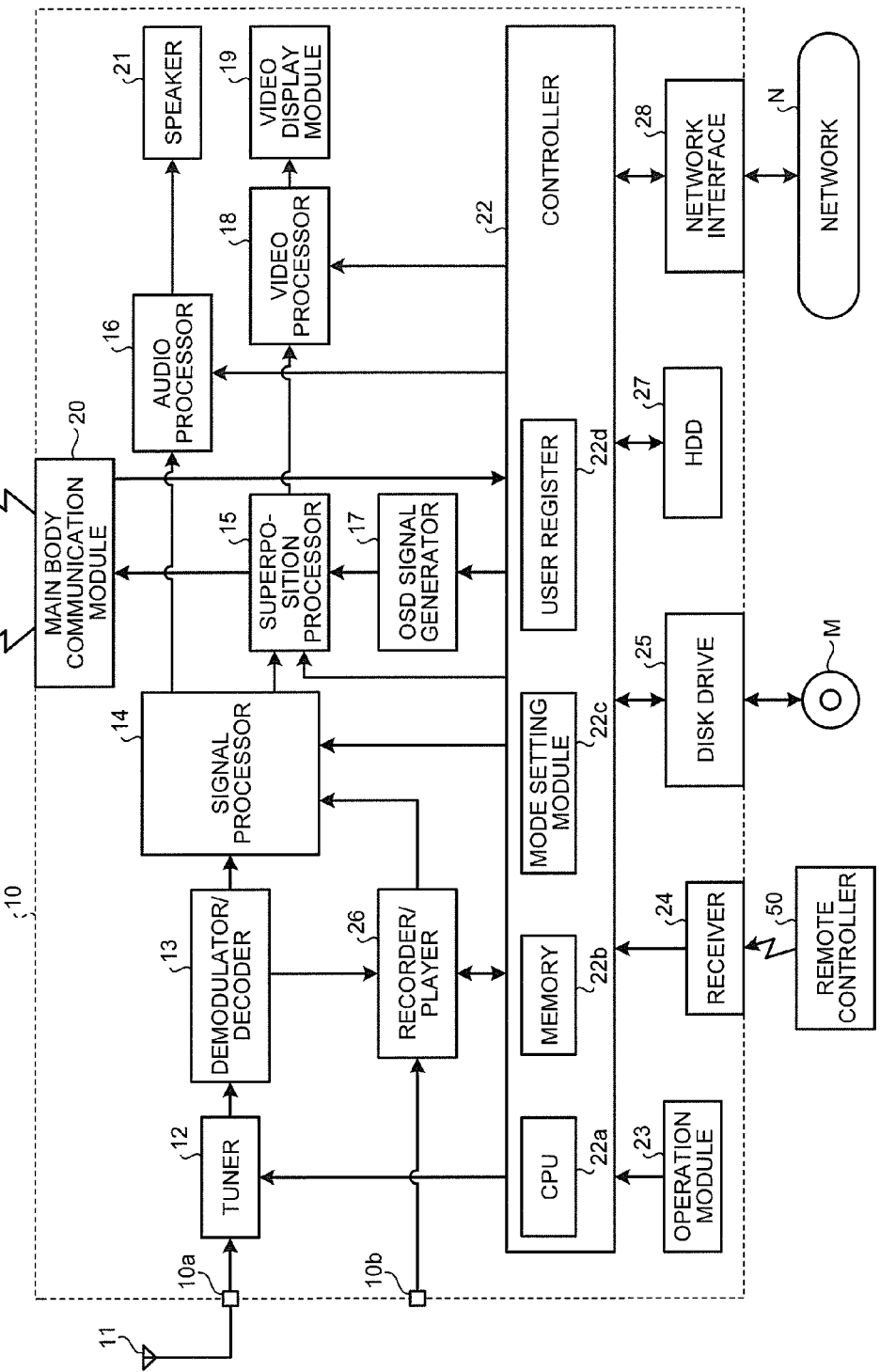
FIG. 1 is an exemplary block diagram of a configuration of a TV broadcast receiver according to an embodiment.

FIG. 1 illustrates a configuration of a TV broadcast receiver 10 according to an embodiment. The TV broadcast receiver 10 is a video display device capable of displaying video based on a video signal for ordinary planar (two-dimensional) display and video based on a video signal for stereoscopic (three-dimensional) display.

A digital TV broadcast signal received by an antenna 11 is supplied via an input terminal 10a to a tuner 12, at which the digital TV broadcast signal of a desired channel is selected under the control of a controller 22. The broadcast signal selected by the tuner 12 is supplied to a demodulator/decoder 13. The demodulator/decoder 13 decodes the broadcast signal into a digital video signal, a digital audio signal, and the like, and then outputs the signals to a signal processor 14.

The signal processor 14 performs predetermined digital signal processing on the digital video and audio signals supplied by the demodulator/decoder 13. Examples of the digital signal processing include conversion of a video signal for ordinary planar (two-dimensional) display into a video signal for stereoscopic (three-dimensional) display, conversion of a video signal (a video signal for right eye vision, a video signal for left eye vision) for stereoscopic display into a video signal for planar display, and the like. The signal processor 14 outputs the digital video signal to a superposition processor 15 and the digital audio signal to an audio processor 16.

On the digital video signal supplied by the signal processor 14, the superposition processor 15 superimposes an on-screen display (OSD) signal generated by an OSD signal generator 17 and then outputs the resultant signal. In this case, if the video signal supplied by the signal processor 14 is a video signal for ordinary planar display, the superposition processor 15 directly superimposes the original OSD signal fed from the OSD signal generator 17 on the video signal and then outputs the resultant signal.

On the other hand, if the video signal supplied by the signal processor 14 is a video signal for stereoscopic display, the superposition processor 15 generates, as described in detail later, a video signal in which the disparity between video for right eye (right-eye video) and video for left eye (left-eye video) is adjusted by an amount according to a mode based on a mode selection signal output from the controller 22. The superposition processor 15 then superimposes the original OSD signal fed from the OSD signal generator 17 on the video signal for stereoscopic display and outputs the resultant signal.

The digital video signal output from the superposition processor 15 is supplied to a video processor 18. The video processor 18 converts the digital video signal into an analog video signal in a format displayable by a flat-screen video display module 19 provided with, for example, a liquid crystal display (LCD) panel at the latter stage. The analog video signal output from the video processor 18 is supplied to the video display module 19 for video display.

A main body communication module 20 communicates with stereoscopic glasses 30 that selects right-eye video or left-eye video to be viewed by the user. More specifically, the main body communication module 20 is connected to the superposition processor 15, and transmits, to the stereoscopic glasses 30, a left-eye shutter control signal or a right-eye shutter control signal output from a glasses controller 48 (see FIG. 2), which will be described later. The main body communication module 20 also outputs data received from the stereoscopic glasses 30 (for example, identification information that uniquely identifies a device received when communication is established with the stereoscopic glasses 30) to the controller 22. The main body communication module 20 may perform communication in any manner such as, for example, using Bluetooth (registered trademark), infrared communication, DLP-Link (registered trademark), or the like.

Figure 2:
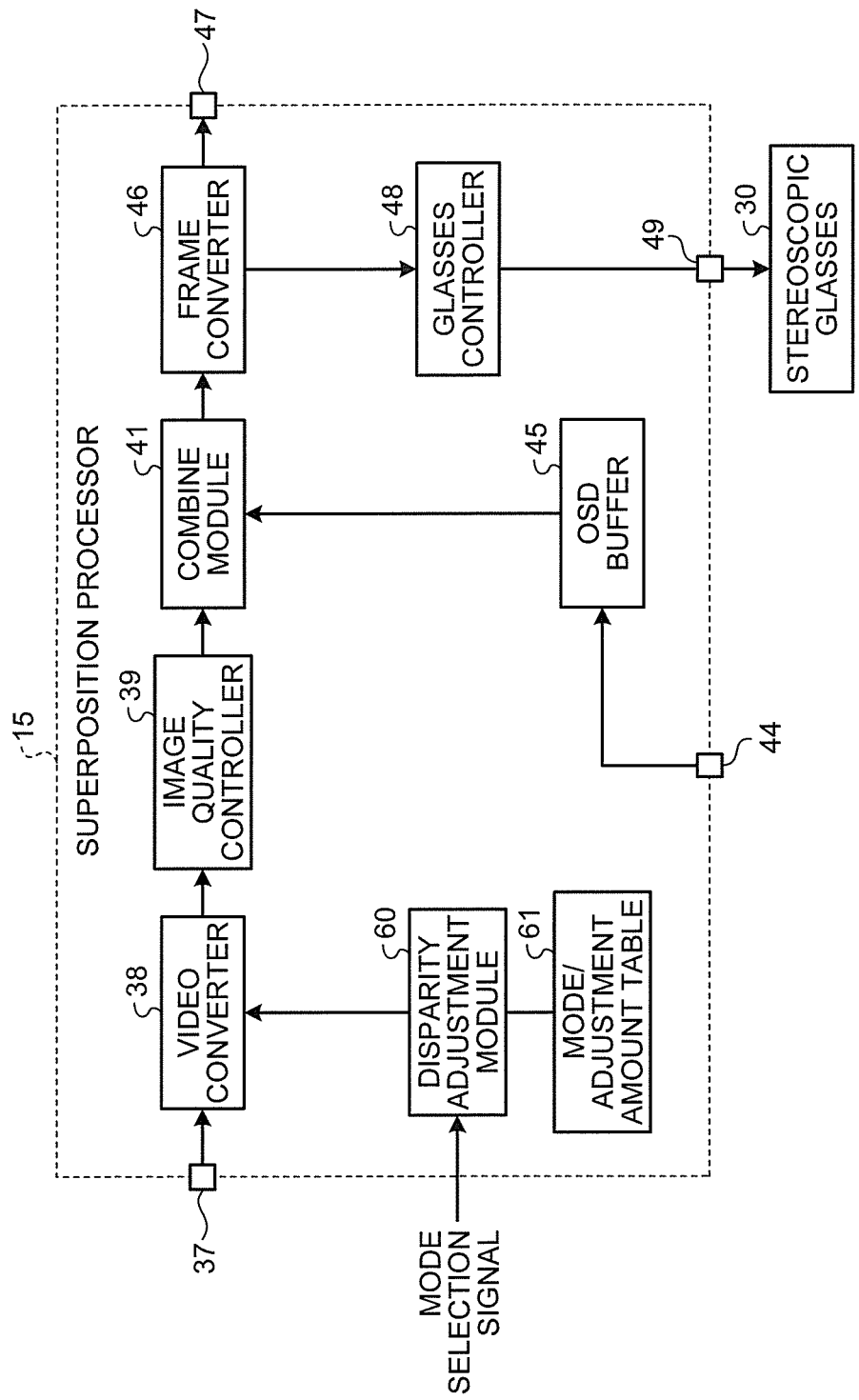
FIG. 2 is an exemplary block diagram of a configuration of a superposition processor in the embodiment.

The superposition processor 15 will be described in detail below. FIG. 2 illustrates an example of a configuration of the superposition processor 15. The digital video signal output from the signal processor 14 is supplied to a video converter 38 via an input terminal 37.

If the input video signal is a video signal for stereoscopic (three-dimensional) display, the video converter 38 converts the video signal into a specific video format and outputs it to an image quality controller 39. Regarding a video signal for stereoscopic display, various video formats are available. Examples of the video formats include a frame packing format and a side-by-side format. In the frame packing format, within a single frame synchronization period, a right-eye video frame is output after a left-eye video frame. In the side-by-side format, within a single horizontal period, a right-eye video line is output after a left-eye video line. Besides, with respect to each video format, there exists a variety in video size, scanning method (interlace/progressive), and the like. Thus, in the antenna 11, it is assumed that the video converter 38 performs appropriate processing such as scaling or interlace/progressive (IP) conversion on an input video signal for stereoscopic display. With this, the video signal is converted into the frame packing format in a video size of 1920 pixels in the horizontal direction×1080 lines in the vertical direction, and is output to the image quality controller 39 in synchronization with a vertical synchronization signal.

Further, if the input video signal is a video signal for stereoscopic (three-dimensional) display, the video converter 38 adjusts the disparity between right-eye video and left-eye video based on an adjustment amount output from a disparity adjustment module 60 according to a mode selection signal. More specifically, the video converter 38 shifts a position in the horizontal direction between a left-eye video frame and a right-eye video frame and a position in the horizontal direction between a left-eye video line and a right-eye video line by an adjustment amount output from the disparity adjustment module 60 to adjust the disparity. The disparity adjustment module 60 refers to a mode/adjustment amount table 61 in which an adjustment amount related to the disparity between right-eye video and left-eye video is set with respect to each mode. Thus, the disparity adjustment module 60 outputs to the video converter 38 an adjustment amount corresponding to a mode indicated by a mode selection signal output from the controller 22.

The image quality controller 39 performs image quality adjustment such as brightness adjustment, contrast adjustment, and hue adjustment on the input video signal under the control of the controller 22, and outputs it to a combine module 41 in synchronization with the vertical synchronization signal. An OSD buffer 45 receives an OSD signal output from the OSD signal generator 17 via an input terminal 44 and stores it. The combine module 41 combines the video signal output from the image quality controller 39 with the OSD signal stored in the OSD buffer 45, and outputs it to a frame converter 46.

The video signal combined by the combine module 41 is output to the frame converter 46. In the frame converter 46, the vertical synchronization frequency of the video signal is converted to be a double value, i.e., the frame frequency is doubled in speed. Then, the video signal is output through an output terminal 47 to the video display module 19 via the video processor 18. With this, the right-eye video frame and the left-eye video frame are alternately displayed on the video display module 19.

A frame synchronization signal generated by the frame converter 46 is supplied to the glasses controller 48. The glasses controller 48 generates shutter control signals for left and right eyes based on the frame synchronization signal received from the frame converter 46. The glasses controller 48 then outputs the shutter control signals through the main body communication module 20 to the stereoscopic glasses 30 connected via an output terminal 49.

Referring back to FIG. 1, the audio processor 16 converts the digital audio signal received from the signal processor 14 into an analog audio signal in a format reproducible by a speaker 21 at the latter stage. The analog audio signal output from the audio processor 16 is supplied to the speaker 21 for audio playback.

The controller 22 controls the overall operation of the TV broadcast receiver 10. The controller 22 comprises a built-in central processing unit (CPU) 22a. Upon receipt of operation information from an operation module 23 installed in the main body of the TV broadcast receiver 10 or operation information received from a remote controller 50 by a receiver 24, the controller 22 controls each module such that the operation information is reflected in the control.

For this control, the controller 22 uses a memory 22b. The memory 22b mainly comprises a read only memory (ROM) that stores a control program to be executed by the CPU 22a, a random access memory (RAM) that provides a work area to the CPU 22a, and a nonvolatile memory that stores various types of setting information, control information, and the like.

A disk drive 25 is connected to the controller 22. The disk drive 25 allows an optical disk M such as a digital versatile disk (DVD) to removably inserted thereinto and has the function of reading/writing digital data with respect to the inserted optical disk M.

In response to the user operation on the operation module 23 or the remote controller 50, the controller 22 controls a recorder/player 26 to encode digital video and audio signals received from the demodulator/decoder 13 and convert the digital signals into a predetermined recording format so that the resultant signals are supplied to the disk drive 25 and recorded on the optical disk M.

In response to the user operation on the operation module 23 or the remote controller 50, the controller 22 controls the disk drive 25 to read digital video and audio signals from the optical disk M so that the digital signals are decoded by the recorder/player 26 and then supplied to the signal processor 14 for video display and audio playback as described above.

A hard disk drive (HDD) 27 is also connected to the controller 22. In response to the user operation on the operation module 23 or the remote controller 50, the controller 22 controls the recorder/player 26 to encode digital video and audio signals received from the demodulator/decoder 13 and convert the digital signals into a predetermined recording format so that the resultant signals are recorded on the HDD 27.

In response to the user operation on the operation module 23 or the remote controller 50, the controller 22 controls the recorder/player 26 to decode digital video and audio signals read from the HDD 27 so that the resultant signals are supplied to the signal processor 14 for video display and audio playback as described above.

An input terminal 10b is connected to the TV broadcast receiver 10. The input terminal 10b allows the TV broadcast receiver 10 to directly receive digital video and audio signals from the outside. Under the control of the controller 22, the digital video and audio signals received via the input terminal 10b are supplied to the signal processor 14 through the recorder/player 26 for video display and audio playback as described above.

Under the control of the controller 22, the digital video and audio signals received via the input terminal 10b are processed by the recorder/player 26 and are supplied to the disk drive 25 to be recorded on the optical disk M or the HDD 27 for playback.

Besides, in response to the user operation on the operation module 23 or the remote controller 50, the controller 22 controls the disk drive 25 to write digital video and audio signals recorded on the optical disk M to the HDD 27, and to write digital video and audio signals recorded in the HDD 27 to the optical disk M.

The controller 22 is also connected to a network interface 28, which is further connected to an external network N. The network interface 28 communicates with external devices (not illustrated) via the network N. Via the network interface 28, the controller 22 can access the external devices connected to the network N for information communication and use the services provided by the external devices.

The controller 22 loads programs stored in the ROM of the memory 22b or the like into the RAM and sequentially executes the programs, thereby implementing a mode setting module 22c and a user register 22d. The mode setting module 22c sets a mode related to an adjustment amount based on the user operation on the operation module 23 or the remote controller 50 and information (identification information, mode information indicating a mode, etc.) notified via the main body communication module 20 from the stereoscopic glasses 30 used by the user (details of mode setting will be described later). A mode set by the mode setting module 22c is given to the superposition processor 15 as a mode selection signal indicating the mode. The user register 22d registers information (age, the stereoscopic glasses 30 to be used, mode related to an adjustment amount, etc.) with respect to each user, details of which will be described later.

Figure 3:
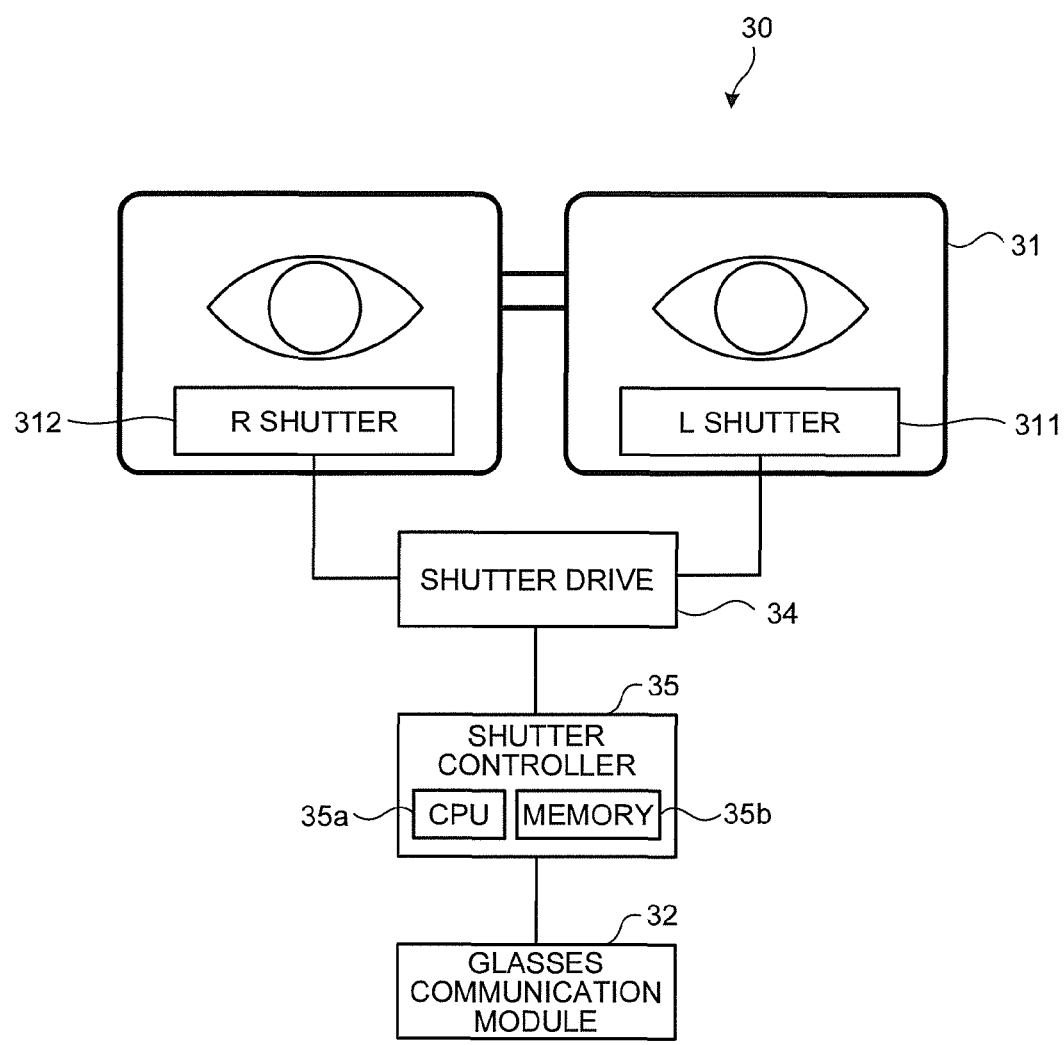
FIG. 3 is an exemplary block diagram of a configuration of stereoscopic glasses in the embodiment.

The stereoscopic glasses 30 will be described with reference to FIG. 3. FIG. 3 illustrates a configuration of the stereoscopic glasses 30. As illustrated in FIG. 3, the stereoscopic glasses 30 comprise LCD shutter glasses 31, a glasses communication module 32, a shutter drive 34, and a shutter controller 35.

The LCD shutter glasses 31 comprise a left-eye LCD shutter (L shutter) 311 that allows or hinders left eye vision and a right-eye LCD shutter (R shutter) 312 that allows or hinders right eye vision. If the user views the video display module 19 while wearing the LCD shutter glasses 31, he/she views left-eye and right-eye images displayed alternately with his/her left and right eyes, respectively. Thus, the user experiences stereoscopic vision.

Figure 4:
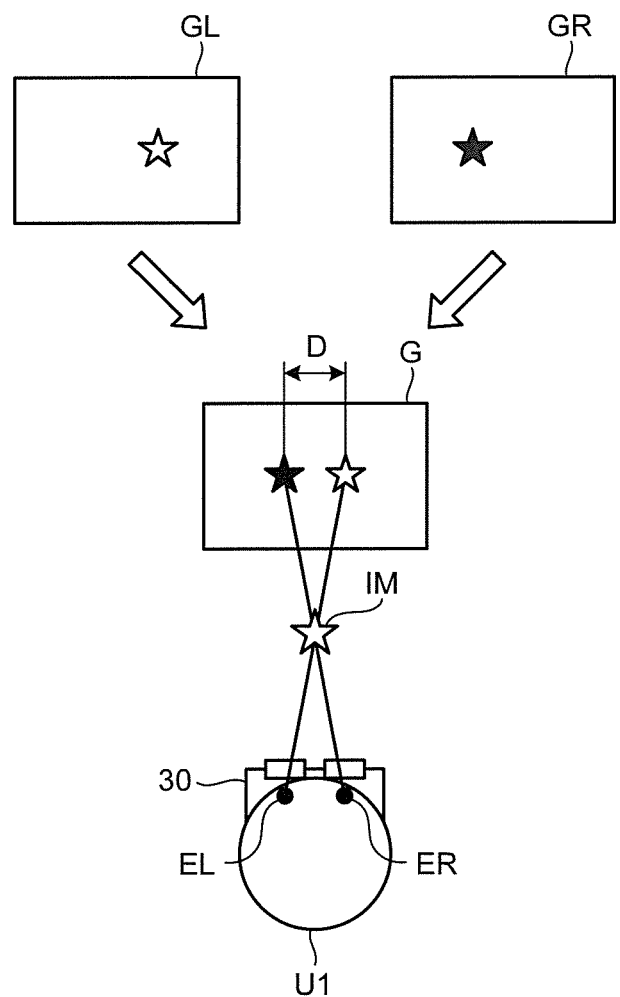
FIG. 4 is an exemplary conceptual diagram for explaining how the user experiences stereoscopic video in the embodiment.

FIG. 4 is a conceptual diagram for explaining how the user experiences stereoscopic vision. As illustrated in FIG. 4, left-eye video GL and right-eye video GR are alternately displayed on the screen G of the video display module 19. When the left-eye video GL is displayed on the screen G, a user U1 wearing the stereoscopic glasses 30 views a white star of the left-eye video GL with the left eye EL. Meanwhile, when the right-eye video GR is displayed on the screen G, the user U1 wearing the stereoscopic glasses 30 views a black star of the right-eye video GR with the right eye ER. Because of disparity D between the stars of the left-eye video GL and the right-eye video GR, the user U1 views a stereoscopic image IN of a star.

Referring back to FIG. 3, the glasses communication module 32 is a communication device compatible with the communication system of the main body communication module 20. The glasses communication module 32 receives left-eye and right-eye shutter control signals from the main body communication module 20 of the TV broadcast receiver 10. Further, under the control of the shutter controller 35, the glasses communication module 32 sends the main body communication module 20 identification information such as device ID that uniquely identifies the device and mode information indicating a mode set in advance to the device.

According to control signals received from the shutter controller 35, the shutter drive 34 opens/closes the L shutter 311 and the R shutter 312 to allow or prevent the transmission of video (light) displayed on the video display module 19 of the TV broadcast receiver 10.

The shutter controller 35 comprises a built-in CPU 35a. According to left-eye and right-eye shutter control signals received through the glasses communication module 32, the shutter controller 35 controls the L shutter 311 and the R shutter 312 to open/close. More specifically, the shutter controller 35 outputs a drive signal to the shutter drive 34 to alternately open and close the L shutter 311 and the R shutter 312 in synchronization with the left-eye and right-eye shutter control signals received through the glasses communication module 32. By the operation of the shutter drive 34 in response to the drive signal, it is realized that the L shutter 311 is open and the R shutter 312 is closed when a left-eye video frame is being displayed on the TV broadcast receiver 10 and that the L shutter 311 is closed and the R shutter 312 is open when a right-eye video frame is being displayed on the TV broadcast receiver 10.

When communication is established with the TV broadcast receiver 10 via the glasses communication module 32 in response to, for example, pressing of a power button (not illustrated), the shutter controller 35 notifies the TV broadcast receiver 10 of identification information and mode information as described above through the glasses communication module 32. For this control, the shutter controller 35 uses a memory 35b. The memory 35b mainly comprises a ROM that stores a control program to be executed by the CPU 35a, a RAM that provides a work area to the CPU 35a, and a non-volatile memory that stores various types of setting information, control information, and the like. The identification information and the mode information are stored in the non-volatile memory.

The mode information is a code that identifies mode such as adult mode to adjust the disparity for adult and child mode to adjust the disparity for child (details will be described later). For example, a code indicating adult mode is set as mode information for the stereoscopic glasses 30 that is designed for adult use. On the other hand, a code indicating child mode is set as mode information for the stereoscopic glasses 30 that is designed for child use.

Figure 5:
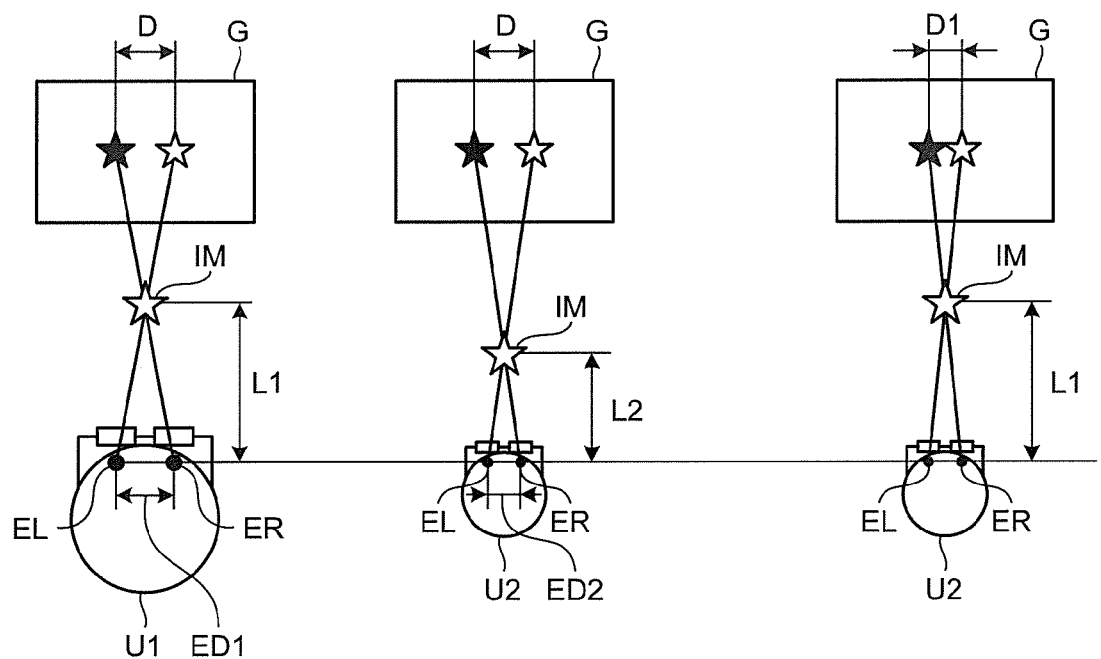
FIG. 5 is an exemplary conceptual diagram for explaining appropriate disparity that varies depending on users in the embodiment.

In the following, a description will be given of mode setting related to disparity adjustment. FIG. 5 is a conceptual diagram for explaining appropriate disparity that varies depending on users. As illustrated in FIG. 5, a user U1 with interocular distance ED1 feels that an image IM of disparity D is at distance L1. Meanwhile, a user U2 with interocular distance ED2 narrower than the interocular distance ED1 feels that the image IM of the disparity D is at distance L2 closer than the distance L1. That is, if the user U2 such as a child views stereoscopic video of the disparity D for the user U1 (adult) with the interocular distance ED1, the video is recognized as being magnified in the depth direction. Thus, by adjusting the disparity D based on the user U1 as adult to narrower disparity D1 and displaying stereoscopic video of the disparity D1 on the screen G, the user U2 such as a child feels that the image IM is at the distance L1. In the TV broadcast receiver 10 of the embodiment, mode is set to adjust the disparity to thereby facilitate disparity adjustment for users.

FIG. 6 is a flowchart of an example of the operation of the TV broadcast receiver 10. As illustrated in FIG. 6, in the TV broadcast receiver 10, the mode setting module 22c sets a mode related to disparity (S1). More specifically, the mode setting module 22c causes the OSD signal generator 17 to generate an OSD signal for mode setting to display a mode setting screen on the video display module 19. Then, the mode setting module 22c sets a mode according to the user operation on the operation module 23 or the remote controller 50.

FIG. 7 illustrates an example of the mode setting screen. As illustrated in FIG. 7, upon mode setting, the video display module 19 displays the mode setting screen that displays mode setting buttons, such as an adult mode button 191 and a child mode button 192, to select and set a mode. The adult mode button 191 is used to select and set adult mode corresponding to an adjustment amount for adult set in the mode/adjustment amount table 61. Meanwhile, the child mode button 192 is used to select and set child mode corresponding to an adjustment amount for child, whose disparity is smaller than that of adult, set in the mode/adjustment amount table 61. By selecting the adult mode button 191 or the child mode button 192 with the operation module 23 or the remote controller 50, the user can easily set a desired mode.

After that, the disparity adjustment module 60 refers to the mode/adjustment amount table 61 based n a mode selection signal corresponding to a mode set by the mode setting module 22c to determine an adjustment amount of the disparity between right-eye video and left-eye video (S2). Subsequently, the video converter 38 generates video in which the disparity between the right-eye video and the left-eye video is adjusted by the adjustment amount determined at S2 (S3), and outputs it to the image quality controller 39.

At S1, if notified by the stereoscopic glasses 30 of a code indicating mode such as adult mode or child mode, the mode setting module 22c may set a mode related to the disparity according to the code. In this case, if a child starts using the stereoscopic glasses 30 for child (communication is established by power-on), a mode related to the disparity is set for the stereoscopic glasses 30 for child to be used. This further facilitates the mode setting.

At S1, if notified by the stereoscopic glasses 30 of identification information, the mode setting module 22c may refer to the user register 22d based on the identification information and set a mode registered in association with the stereoscopic glasses 30. More specifically, the mode setting module 22c may set a mode registered in association with a user who uses the stereoscopic glasses 30.

A description will be given of the user register 22d. The user register 22d registers the stereoscopic glasses 30 used by a user and a mode related to the disparity corresponding to the user with respect to each pair of the stereoscopic glasses 30, more particularly, with respect to each user who uses stereoscopic glasses. More specifically, the user register 22d causes the OSD signal generator 17 to generate an OSD signal to specify various settings for each user to display a user registration screen on the video display module 19. Then, the user register 22d registers settings according to the user operation on the operation module 23 or the remote controller 50.

Figure 8:
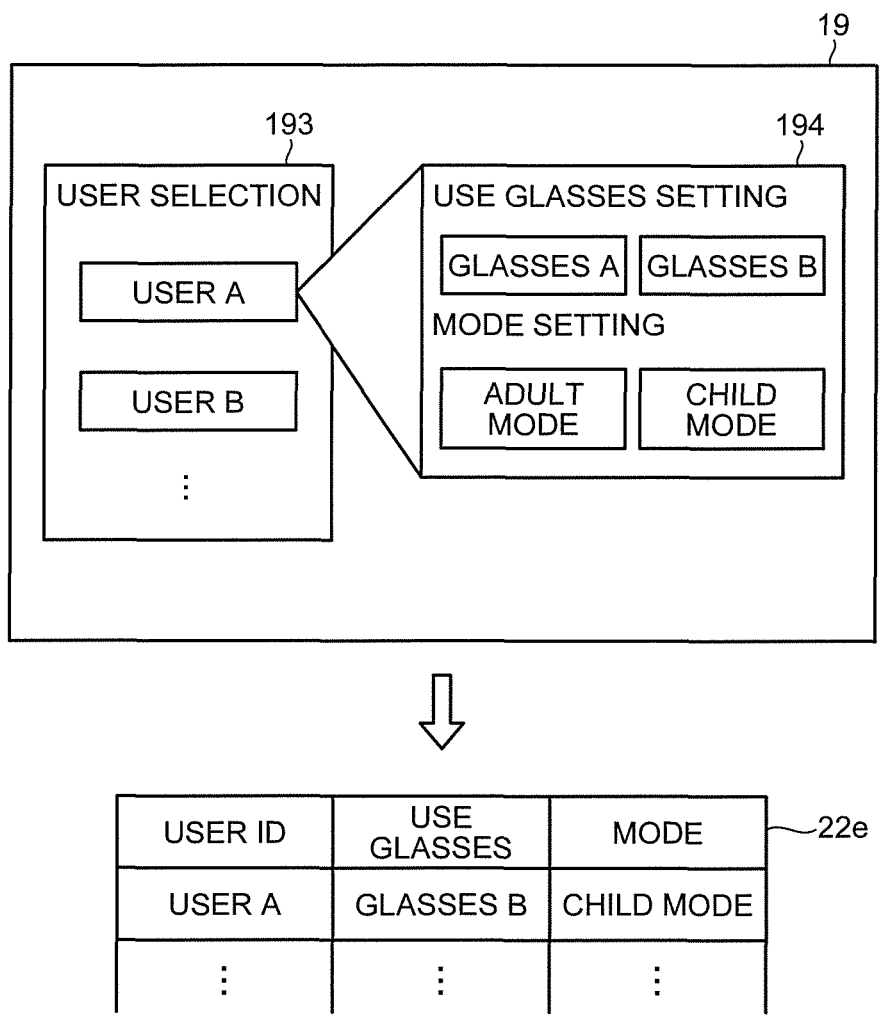
FIG. 8 is an exemplary conceptual diagram for explaining user information registration in the embodiment.

FIG. 8 is a conceptual diagram for explaining user information registration. As illustrated in FIG. 8, upon registration of user information, the video display module 19 displays a user selection screen 193 to select a user to be registered. The user register 22d then displays a user registration screen 194 on the video display module 19 to set the stereoscopic glasses 30 to be used by the user selected on the user selection screen 193 and a mode related to the disparity. The user sequentially sets the user, the stereoscopic glasses 30 to be used, and a mode with the operation module 23 or the remote controller 50. Thus, a mode is registered for the stereoscopic glasses 30. More specifically, a user who uses the stereoscopic glasses 30 and information related to the mode for the user are registered. The registered information is stored in the memory 22b or the like in the form of a user information table 22e that indicates a user ID, identification information that identifies the stereoscopic glasses 30 to be used, and a set mode as one record.

With this, when a user starts using the stereoscopic glasses 30 that has already been registered by the user register 22d (communication is established by power-on), the disparity can be adjusted according to a mode registered in advance. This further facilitates the mode setting.

At S1, if notified by the stereoscopic glasses 30 of identification information, the mode setting module 22c may refer to the user register 22d based on the identification information and set a mode based on the registered age of a user who uses the stereoscopic glasses 30.

FIG. 9 is a conceptual diagram for explaining user information registration. As illustrated in FIG. 9, upon registration of user information, the user register 22d displays a user registration screen 195 on the video display module 19 to set the stereoscopic glasses 30 to be used by the user selected on the user selection screen 193 and the age of the user. The date of birth may be registered in addition to or instead of the age at the time of registration.

The user sequentially sets the user, the stereoscopic glasses 30 to be used, and age with the operation module 23 or the remote controller 50. Thus, user information is registered. The registered information is stored in the memory 22b or the like in the form of the user information table 22e that indicates a user ID, identification information that identifies the stereoscopic glasses 30 to be used, and age as one record. The user register 22d has real time clock (RTC) function to count the time. According to elapsed time since the registration, the user register 22d updates the user's age registered in the user information table 22e. For example, the user information table 22e stores date and time when age is set and the age as information indicating the age at the time of registration. When one year has elapsed since the setting of the age, the user register 22d updates the registered age. With this, the user's age registered by the user register 22d is updated as he/she gets older.

With reference to an age/mode conversion table 22f where age and mode related to the disparity are set in advance, the mode setting module 22c can set a mode according to the age of a user who uses the stereoscopic glasses 30. It is assumed herein that the age/mode conversion table 22f is set in advance in the memory 22b or the like.

With this, when a user starts using the stereoscopic glasses 30 that has already been registered by the user register 22d (communication is established by power-on), the disparity can be adjusted according to age registered in advance. This further facilitates the mode setting.

At S1, if a plurality of modes are specified based on notifications (identification information, mode information) from a plurality of pairs of the stereoscopic glasses 30, the mode setting module 22c may set a mode to make the disparity smaller after adjustment with reference to the mode/adjustment amount table 61. More specifically, if the stereoscopic glasses 30 for adult as well as the stereoscopic glasses 30 for child start being used, and if notified by each of them of mode information, the mode setting module 22c may set child mode to reduce the disparity after adjustment. Besides, if notified by each of pairs of the stereoscopic glasses 30 used by two users, respectively, of identification information, among modes set by the users or those specified by their ages, the mode setting module 22c may set a mode that makes the disparity smaller after adjustment. In this manner, if a plurality of pairs of the stereoscopic glasses 30 are used at the same time, the mode setting module 22c preferentially sets a mode that makes the disparity smaller.

A computer program may be executed on a computer to realize the same function as the TV broadcast receiver 10. The computer program may be provided as being stored in advance in ROM or the like. The computer program may also be provided as being stored in a computer-readable storage medium, such as a compact disc-read only memory (CD-ROM), a flexible disk (FD), a compact disc recordable (CD-R), and a digital versatile disc (DVD), as a file in an installable or executable format.

The computer program may also be stored in a computer connected via a network such as the Internet so that it can be downloaded therefrom via the network. Further, the computer program may be provided or distributed via a network such as the Internet.

The computer program comprises modules that implement the elements described above. As real hardware, the CPU (processor) loads the computer program from the ROM into the main memory and executes it. With this, the above elements are implemented on the main memory.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stereoscopic video processor comprising:
a registration module configured to register a plurality of pairs of stereoscopic glasses in association with a plurality of modes each specifying an adjustment amount related to disparity between a first stereoscopic video and a second stereoscopic video, respectively;
a mode setting module configured to set a mode from among the plurality of modes;
an adjustment module configured to adjust the disparity between the first stereoscopic video and the second stereoscopic video by an adjustment amount corresponding to the mode set by the mode setting module; and
a communication module configured to communicate with one of the pairs of stereoscopic glasses for viewing the first stereoscopic video and the second stereoscopic video the disparity between which is adjusted by the adjustment module, wherein
the mode setting module is configured to set the mode registered in association with the one of the pairs of stereoscopic glasses according to a notification from the one of the pairs of stereoscopic glasses.

2. The stereoscopic video processor of claim 1, wherein the notification from the one of the pairs of stereoscopic glasses is identification information that identifies the one of the pairs of stereoscopic glasses.

3. The stereoscopic video processor of claim 1, wherein
the registration module is configured to register the pairs of stereoscopic glasses in association with the modes for a plurality of users, respectively, the pairs of stereoscopic glasses being to be used by the users, respectively, and
the mode setting module is configured to set one of the modes registered in association with one of the pairs of stereoscopic glasses to be used according to a notification from the one of the pairs of stereoscopic glasses.

4. The stereoscopic video processor of claim 1, wherein
the registration module is configured to register the pairs of stereoscopic glasses in association with ages of a plurality of users for the users, respectively, the pairs of stereoscopic glasses being to be used by the users, respectively, and
the mode setting module is configured to set one of the modes corresponding to age of one of the users of one of the pairs of stereoscopic glasses to be used according to a notification from the one of the pairs of stereoscopic glasses.

5. The stereoscopic video processor of claim 4, wherein the registration module is configured to update the ages according to elapsed time since registration of information indicating the ages.

6. The stereoscopic video processor of claim 1, wherein the mode setting module is configured to set, from among a plurality of modes specified by notifications from a plurality of pairs of stereoscopic glasses, respectively, a mode that makes the disparity smaller after adjustment.

7. A stereoscopic video processing method applied to a stereoscopic video processor comprising a communication module configured to communicate with one of a plurality of pairs of stereoscopic glasses for viewing first stereoscopic video and second stereoscopic video having disparity, the stereoscopic video processing method comprising:
registering the pairs of stereoscopic glasses in association with a plurality of modes each specifying an adjustment amount related to disparity between the first stereoscopic video and second stereoscopic video, respectively;

setting a mode from among the modes; and;
generating video in which the disparity between the first stereoscopic video and the second stereoscopic video is adjusted by an adjustment amount corresponding to the mode set at the setting; wherein
the mode setting module is configured to set the mode registered in association with the stereoscopic glasses according to a notification from the stereoscopic glasses.

\* \* \* \* \*